US010722941B2

(12) United States Patent
Harbour et al.

(10) Patent No.: US 10,722,941 B2
(45) Date of Patent: Jul. 28, 2020

(54) AUTOMATED GATE CUTTING SYSTEM

(71) Applicant: Mueller International, LLC, Atlanta, GA (US)

(72) Inventors: Theodore Chad Harbour, Decatur, IL (US); Timothy P. Hipp, Decatur, IL (US); Kelby Wayne Klink, Monticello, IL (US); Donald Johnson, Downers Grove, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/956,452

(22) Filed: Apr. 18, 2018

(65) Prior Publication Data
US 2018/0304350 A1    Oct. 25, 2018

Related U.S. Application Data

(60) Provisional application No. 62/487,383, filed on Apr. 19, 2017.

(51) Int. Cl.
*B22D 17/20* (2006.01)
*B22D 31/00* (2006.01)
(Continued)

(52) U.S. Cl.
CPC ......... *B22D 17/2076* (2013.01); *B22D 31/00* (2013.01); *B22D 31/002* (2013.01); *B23K 26/032* (2013.01); *B23K 26/352* (2015.10)

(58) Field of Classification Search
CPC .............. B22D 17/2076; B22D 31/002; B23K 26/352; B23K 26/032
See application file for complete search history.

(56) References Cited

U.S. PATENT DOCUMENTS

| 299,142 | A | * | 5/1884 | Hilton | ................. | B23D 61/023 |
| | | | | | | 83/838 |
| 646,284 | A | * | 3/1900 | Hilton | ................. | B23D 61/023 |
| | | | | | | 407/47 |

(Continued)

FOREIGN PATENT DOCUMENTS

| WO | 2003086685 | 10/2003 |
| WO | 2018195190 | 10/2018 |

OTHER PUBLICATIONS

Harbour, Theodore Chad; International Search Report and Written Opinion for PCT Application No. PCT/US2018/028155, filed Apr. 18, 2018, dated Aug. 22, 2018, 12 pgs.

(Continued)

*Primary Examiner* — Omar Flores Sanchez
(74) *Attorney, Agent, or Firm* — Taylor English Duma LLP

(57) ABSTRACT

A system for separating a part from a monolithic tree includes a camera positioned facing the tree and configured to identify a cut mark on a gate of the tree; and a cutter configured to cut the part from the tree at the cut mark. A method for separating a part from a monolithic tree includes marking the tree with a cut mark; identifying the cut mark with a camera; determining an orientation and a position of the cut mark; determining an orientation and a position of the tree from the orientation and the position of the cut mark; transmitting information on the orientation and position of the tree from the camera to a cutter; and cutting the part from the tree.

20 Claims, 12 Drawing Sheets

(51) Int. Cl.
   *B23K 26/03*       (2006.01)
   *B23K 26/352*      (2014.01)

(56) References Cited

U.S. PATENT DOCUMENTS

| | | | |
|---|---|---|---|
| 2,670,766 A * | 3/1954 | Hiltebrand | B23D 61/023 83/838 |
| 3,633,637 A * | 1/1972 | Kolesh | B23D 61/023 83/840 |
| 3,916,484 A | 11/1975 | Kennedy | |
| 4,109,699 A * | 8/1978 | Miller | B22C 7/02 164/244 |
| 5,761,981 A * | 6/1998 | Stoffels | B23D 61/023 241/294 |
| 6,638,137 B1 | 10/2003 | Dempsey | |
| 2003/0139841 A1 | 7/2003 | Decord, Jr. | |
| 2019/0093314 A1* | 3/2019 | Nilsson | B23D 61/026 |

OTHER PUBLICATIONS

Harbour, Theodore Chad; International Preliminary Report on Patentability for PCT Application No. PCT/US2018/028155, filed Apr. 18, 2018, dated Oct. 31, 2019, 9 pgs.

* cited by examiner

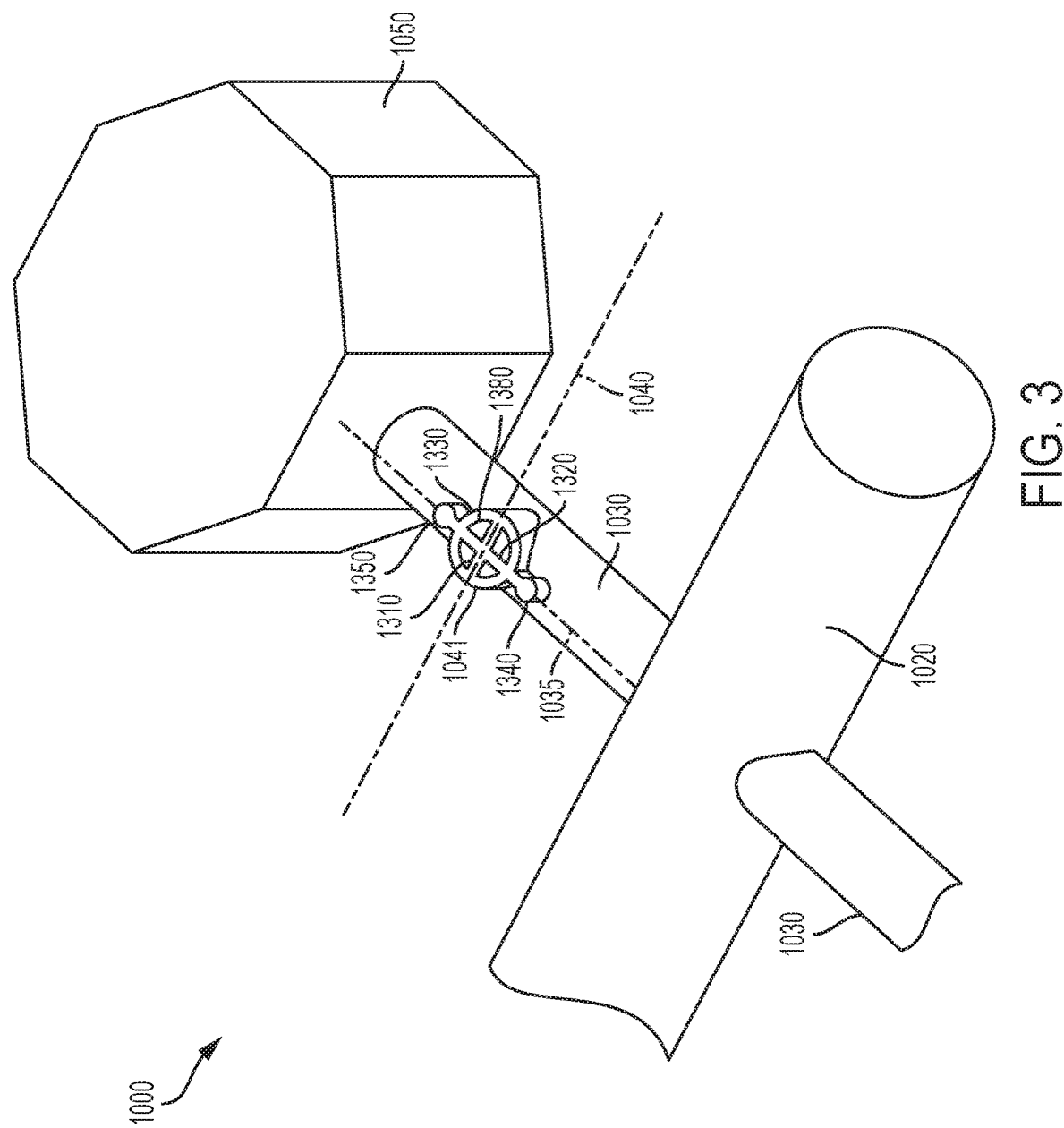

US 10,722,941 B2

AUTOMATED GATE CUTTING SYSTEM

REFERENCE TO RELATED APPLICATIONS

This application claims the benefit of U.S. Provisional Application No. 62/487,383, filed Apr. 19, 2017, which is hereby specifically incorporated by reference herein in its entirety.

TECHNICAL FIELD

Field of Use

This disclosure relates to systems for automated fabrication and separation of cast or molded parts. More specifically, this disclosure relates to a system for separating cast or molded arts from each other using automated machine vision and cutting processes.

Related Art

Cast or molded parts, and in particular parts that are small enough, are often cast or molded together in sets for efficiency and other manufacturing considerations. One set can be a "tree" comprising multiple parts joined by a sprue and runners. After casting or molding, the sprue can resemble the trunk of the tree and the runners, which can connect each part to the sprue, can resemble a branch of the tree. Depending on the properties of the material used to cast or mold the parts, the parts can sometimes be simply snapped or cut off or simple automated processes can be used to separate the parts before further processing as desired. If the material used to form the parts or the part's connection to the tree is sufficiently strong, however, these previously contemplated processes can become more difficult, ineffective, inconsistent, inflexible, expensive, and/or unsafe.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a system for separating a part from a monolithic tree, the system comprising: a camera positioned facing the tree and configured to identify a cut mark on a gate of the tree; and a cutter configured to cut the part from the tree at the cut mark.

In yet another aspect, disclosed is a monolithic tree, the tree comprising: a sprue; a runner formed integrally with the sprue; a plurality of parts, each of the plurality of parts formed integrally with the runner; and a plurality of gates, each gate comprising a cut mark and connecting a one of the plurality of parts to the runner.

In a further aspect, disclosed is a method for separating a part from a monolithic tree, the method comprising: marking the tree with a cut mark; identifying the cut mark with a camera; determining an orientation and a position of the cut mark; determining an orientation and a position of the tree from the orientation and the position of the cut mark; transmitting information on the orientation and position of the tree from the camera to a cutter; and cutting the part from the tree.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 3 is a perspective view of a portion of a tree processed by the system of FIG. 1 showing a cut mark and a cutting reference in accordance with one aspect of the current disclosure.

DETAILED DESCRIPTION

Figure 2:
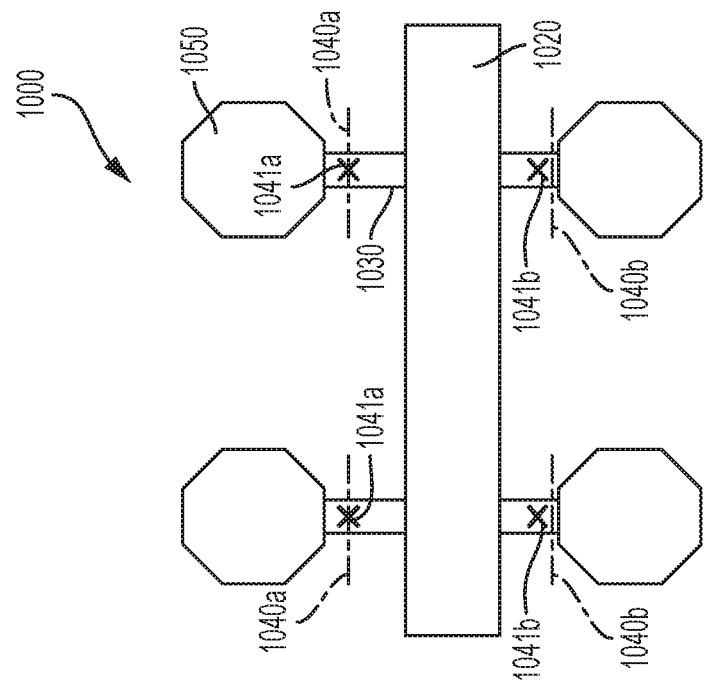
FIG. 2 is a detail view of the tree of FIG. 1 taken from detail 2 of FIG. 1.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "top," "bottom," "side," "upper," "lower," "horizontal," and/or "vertical" may be referenced. Unless stated otherwise, "top" describes that side of the system or component that is facing upward and "bottom" is that side of the system or component that is opposite or distal the top of the system or component and is facing downward. Unless stated otherwise, "side" describes that an end or direction of the system or component facing in horizontal direction. "Horizontal" or "horizontal orientation" describes that which is in a plane aligned with the horizon. "Vertical" or "vertical orientation" describes that which is in a plane that is angled at 90 degrees to the horizontal.

In one aspect, an automated gate cutting system and associated methods, systems, devices, and various apparatuses are disclosed herein. In one aspect, the automated gate cutting system can comprise a camera and a robotic cutting arm.

Cast or molded parts can be made from a variety of materials and using a variety of processes. Regardless of the specific method or material used, as suggested above, such parts can be cast or molded together in sets for efficiency and other manufacturing considerations. One set of integrally cast or molded parts can resemble a monolithic "tree" comprising multiple parts joined by a sprue and runners. Depending on the properties of the material used to cast or mold the parts, the parts can sometimes be simply snapped or cut off—not unlike the molded parts included in a model airplane kit—or simple automated processes can be used to separate the parts before further processing as desired. For example, in a mechanical tumbling operation each part of the set of integrally cast or molded parts can be made to experience stresses that will cause the individual parts to separate from each other. As noted above, when a stronger material is used the previously contemplated processes can become more difficult, ineffective, inconsistent, inflexible, expensive, and/or unsafe. More specifically, it can become impractical to use those processes at all because they cannot be guaranteed to separate the parts from one another without additional steps.

Parts can be cast in a variety of materials including, for example and without limitation, metal, epoxy, concrete, plaster, and clay. Parts can be cast using a variety of processes including, for example and without limitation, investment casting, die casting, lost-wax casting, and sand casting. Parts can be molded in a variety of materials including, for example and without limitation, plastic, paper, cardboard, and even food. Parts can be molded using a variety of processes including, for example and without limitation, injection molding, extrusion molding, rotomolding, and thermoforming.

The terms "cast" and "mold," "casting" and "molding" can in a broad sense be used interchangeably, although over the course of time the terms "cast" and "casting" have generally become associated with parts fabricated in a mold from harder materials such as metal and the other harder materials listed above; and the terms "mold" and "molding" have generally become associated with parts fabricated in a mold from softer materials such as plastic and the other softer materials listed above. Throughout this application a reference to "cast" or "casting" can be interpreted as referring also to "mold" or "molding" and vice versa.

Alloyed metals or "alloys" are commonly used in cast parts to produce parts having improved properties such as in the areas of strength, corrosion resistance, or fatigue resistance. Silicon-brass, just one example of a family of low-lead alloys with relatively high strength (the family including, for example and without limitation, the alloys designated as C87600, C87610, and C87850), can be advantageous to use for certain cast fittings but at the same time can require larger casting "gates" to facilitate the flow of material into a mold. Because of the larger gates and the greater material strength, conventional methods of automatically separating cast parts can become ineffective. Manually cutting 100% of the parts off each casted "tree," however, can be labor intensive and present other disadvantages such as those highlighted above. While an automated system of cutting each part from the tree using preprogrammed cutting patterns for each set of cast parts could be helpful, the large number of different patterns, the reality of ongoing design revisions necessitating constant programming updates, and the various positioning jigs that the process may necessitate make it worthwhile to consider another approach.

As will be described below (and as shown, e.g., in FIG. 9), a system 80 for separating cast or molded parts 1050 using automated machine vision and robotic cutting elements is one such approach.

Figure 1:
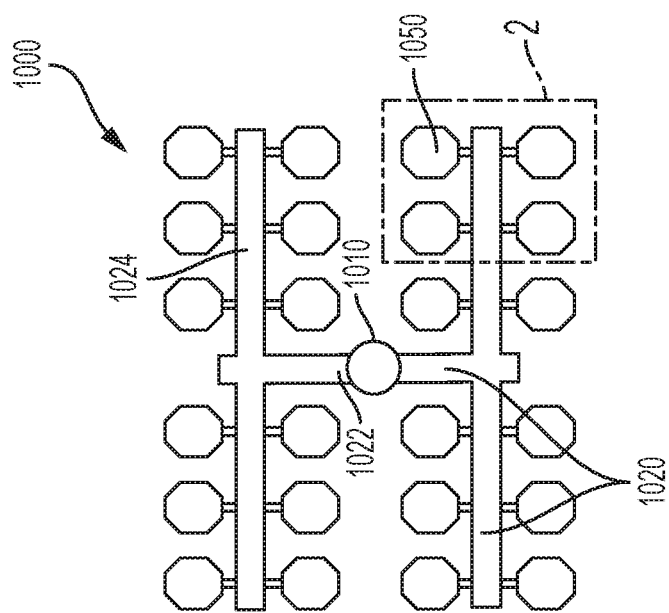
FIG. 1 is a top plan view of a "tree" processed by the system described herein in accordance with one aspect of the current disclosure, the tree comprising a sprue, runners, and parts joined to the tree at gates.

As shown in FIGS. 1 and 2, each of the parts 1050 can be cast or molded as part of a tree 1000. The tree 1000 can be monolithic, which means at least to be cast, molded, or otherwise formed as a single piece. The tree 1000 can comprise a sprue 1010 formed from the material that hardens inside a mold 110 (shown in FIG. 9) of the system 80 and extending from an entrance of the mold 110 into which liquid material forming the tree 1000 is poured or injected to a plurality of runners 1020 of the tree 1000. The plurality of runners 1020 can harden inside the mold 110 and extend from the sprue 1010 to a gate 1030 connecting each of the parts 1050 to one of the plurality of runners 1020. The plurality of runners 1020 can comprise a main runner or a primary runner 1022, which can extend from the sprue 1010, and a subrunner, a branch runner, or a secondary runner 1024, which can extend from the primary runner 1022. The sprue 1010, the runners 1020, and the gates 1030 can together be called "gating." To help facilitate proper flow of the material into the mold 110, each gate 1030 can be made smaller in diameter than each connecting runner 1020, which can be made smaller in diameter than the sprue 1010. The sprue 1010, the runners 1020, the gates 1030, and the parts 1050 can be arranged to produce any one of a variety of patterns. In one aspect, as shown, the parts 1050 can be substantially aligned in a single plane. In another aspect, the parts 1050 can be molded in different planes. The tree 1000 can be configured to be symmetrical about one or more planes of the tree 1000.

As shown in FIG. 2, a cut mark 1041 can be cast or molded into the gate 1030 at a desired cutting reference 1040, which can be a cutting plane or a cutting line along which it is desirable to cut the gate 1030 to separate the part 1050 from the remainder of the tree 1000. In some aspects, as shown in a first half of the tree 1000 of FIG. 2, each of cutting references 1040a can intersect the cut marks 1041a. In other aspects, as shown in a second half of the tree 1000 of FIG. 2, each of cutting references 1040b can be offset from the cut marks 1041b, in which case the cutting references 1040b need not intersect the cut marks 1041b.

In one aspect, for example and without limitation, the cut mark 1041 can be formed as shown in FIG. 3. The cutting reference 1040 can be made to intersect the gate 1030 at a position at either of an intersection of the gate 1030 and the part 1050 and an intersection of the gate 1030 and the runner 1020 or between the intersection of the gate 1030 and the part 1050 and the intersection of the gate 1030 and the runner 1020. In another aspect, the cut mark 1041 can be added manually or automatically after casting or molding of the tree 1000 such as, for example and without limitation, by marking with a black or colored paint or ink, by affixing a label—with either standard ink or a special ink (for example and without limitation, containing an luminescent material that emits light either naturally or else when light is directed at it), or by etching a design into the part 1050 such as with a laser. Optionally, the cut mark 1041 associated with each part 1050 can be made to face in the same direction. Optionally, the cutting references 1040 associated with some or all of the parts 1050 can be made to align with each other (i.e., in a direction that is parallel or collinear with each other). In other aspects, the cut mark 1041 need not be located on the gate 1030 but can be positioned adjacent to the gate 1030 such as, for example and without limitation, on the runner 1020, on the part 1050, or on another portion of the tree 1000.

In various aspects, as shown in FIG. 3, the cut mark 1041 can be made symmetric about an axis 1035 of the gate 1030 or about the cutting reference 1040 but nonetheless have a different geometry in each direction (i.e., along the axis 1035 and along the cutting reference 1040). Such a design for the cut mark 1041 can facilitate a camera 800 (shown in FIG. 9) being able to determine the orientation of the cut mark 1041 and therefore also the gate 1030 and the remainder of the tree 1000 and be able to provide instructions to a cutter 900 (shown in FIG. 9) of the system 80 to cut the gate 1030 along the cutting reference 1040 and not along some other line that may not separate the part 1050 from the tree 1000 or that may even damage the part 1050. Depending on the configuration of the camera 800 and the environment in which the camera 800 is used, the shape and the position and other characteristics of the cut mark 1041 can be adjusted.

As shown, the cut mark 1041 can comprise one or more portions. In some aspects, a first portion 1310 of the cut mark 1041 can intersect a second portion 1320 of the cut mark 1041. The cut mark 1041 can further comprise a third portion 1330, which can intersect either the first portion 1310 or the second portion 1320 or both the first portion 1310 and the second portion 1320. The cut mark 1041 can comprise a fourth portion 1340 extending from any of the first portion 1310, the second portion 1320, or the third portion 1330. Likewise, the cut mark 1041 can comprise a fifth portion 1350 extending from any of the first portion 1310, the second portion 1320, or the third portion 1330. In some aspects, a portion 1310 of the cut mark 1041 can protrude from a surface of the tree 1000. In other aspects, a portion of the cut mark 1041 can be recessed below a surface of the tree 1000. The cut mark 1041 can define a cavity 1380 therein.

An wide variety of configurations of the tree 1000 are contemplated herein. In some aspects, manufacturing scenarios involving a large number of variations can yield the greatest benefit from the system 80 described herein. This is at least because without programming any of the various geometries of the tree 1000 into the system 80, the cut marks 1041 alone can enable the system 80 to identify the cutting reference 1040 along which to cut the parts 1050 from the tree 1000.

Figure 4:
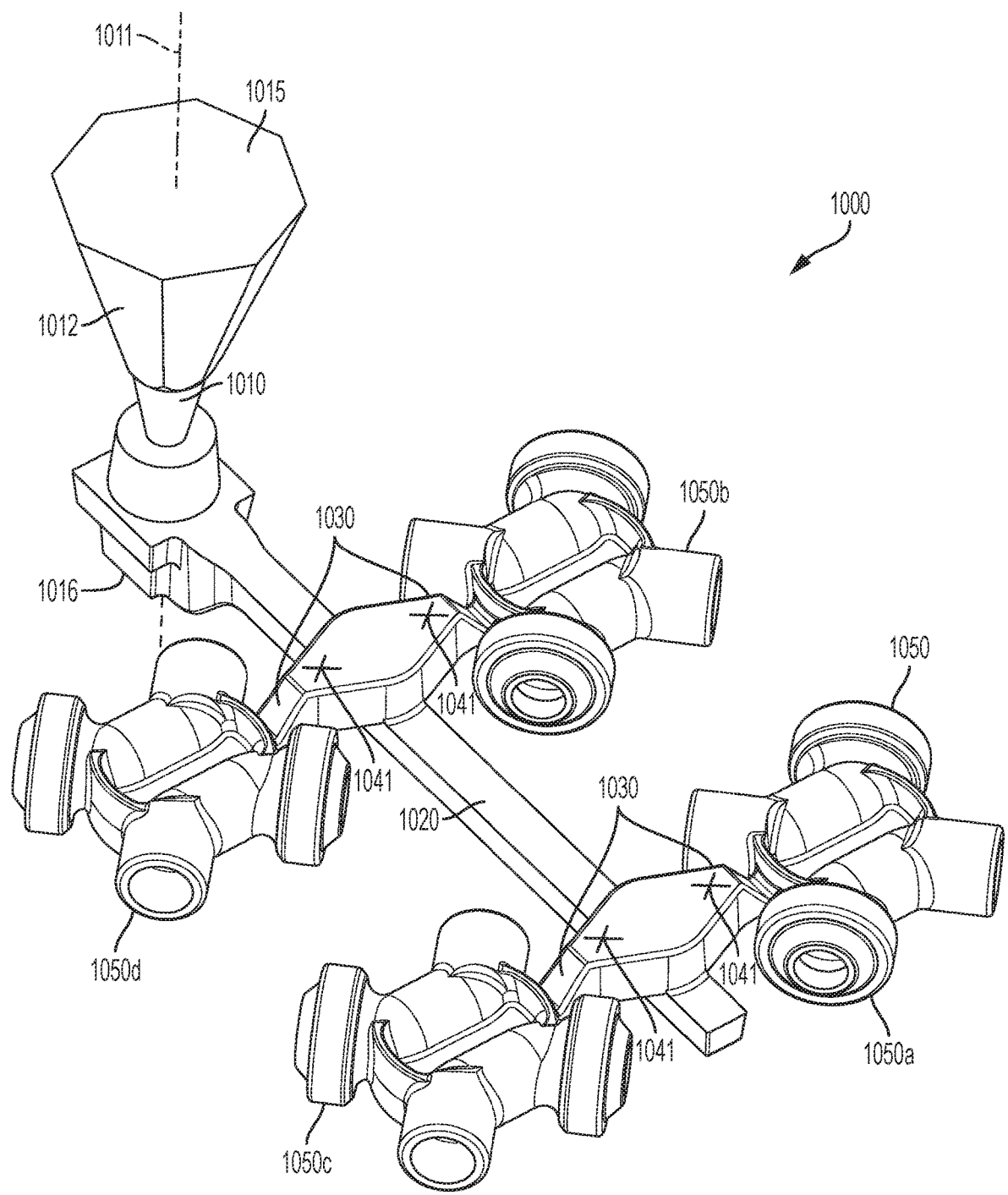
FIG. 4 is a perspective view of the tree of FIG. 1 in accordance with another aspect of the current disclosure.

As shown in FIG. 4, the tree 1000 can comprise the sprue 1010, the runner 1020, the plurality of gates 1030, and the plurality of parts 1050. The plurality of parts 1050 can comprise parts 1050a,b,c,d. The sprue 1010 can define a sprue axis 1011 extending from a first or top end 1015 to a second or bottom end 1016 of the sprue 1010 through a center of the sprue 1010, and the sprue axis 1011 can be aligned with a vertical direction. A pouring cup or pour cup 1012 can be positioned proximate to the top end 1015 of the sprue 1010 (and the corresponding cavity in the mold 110 for forming the sprue 1010) to facilitate safe and efficient pouring of the liquid—and often extremely high-temperature—material into the mold 110. As shown, each of the cut marks 1041 is represented by an "X" but can comprise any desired geometry such as, for example and without limitation, that geometry described elsewhere herein.

Figure 5:
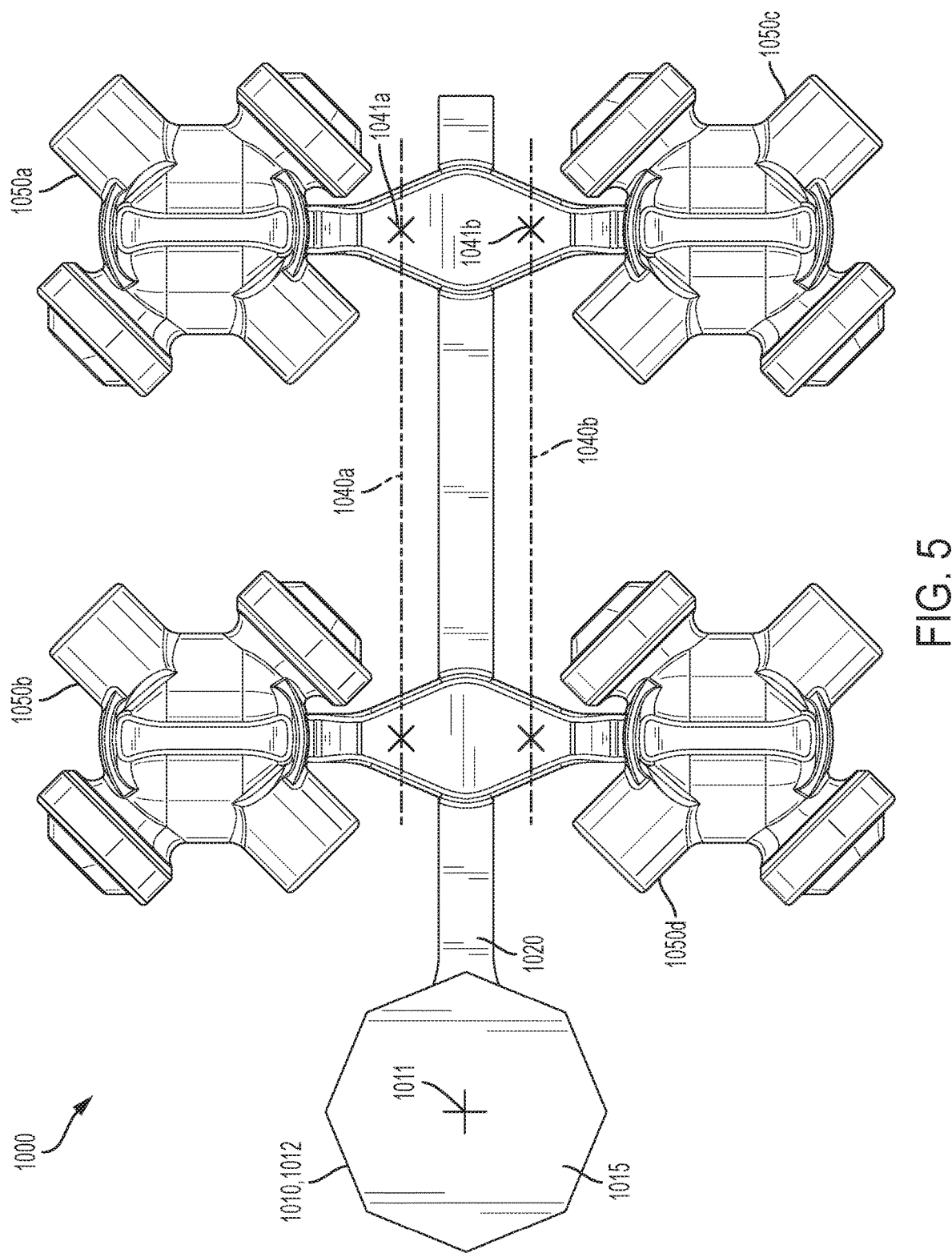
FIG. 5 is a top plan view of the tree of FIG. 4 showing a pair of cutting references.

As shown in FIG. 5, in some aspects, including when the tree 1000 comprises a plurality of cut marks 1041, a corresponding portion of each of the cut marks 1041a,b can be aligned along a single axis such as, for example and without limitation, the cutting reference 1040a or the cutting reference 1040b. As shown, the cutting reference 1040a or the cutting reference 1040b or the cutting reference 1040a or the cutting reference 1040b can be positioned such that movement of the cutter 900 with respect to the tree 1000 or movement of the tree 1000 with respect to the cutter 900 cuts the parts 1050a,b,c,d being cut from the tree 1000 without themselves being damaged because, for example, a portion of the parts 1050a,b,c,d intersects either of the cutting references 1040a,b.

Figure 6:
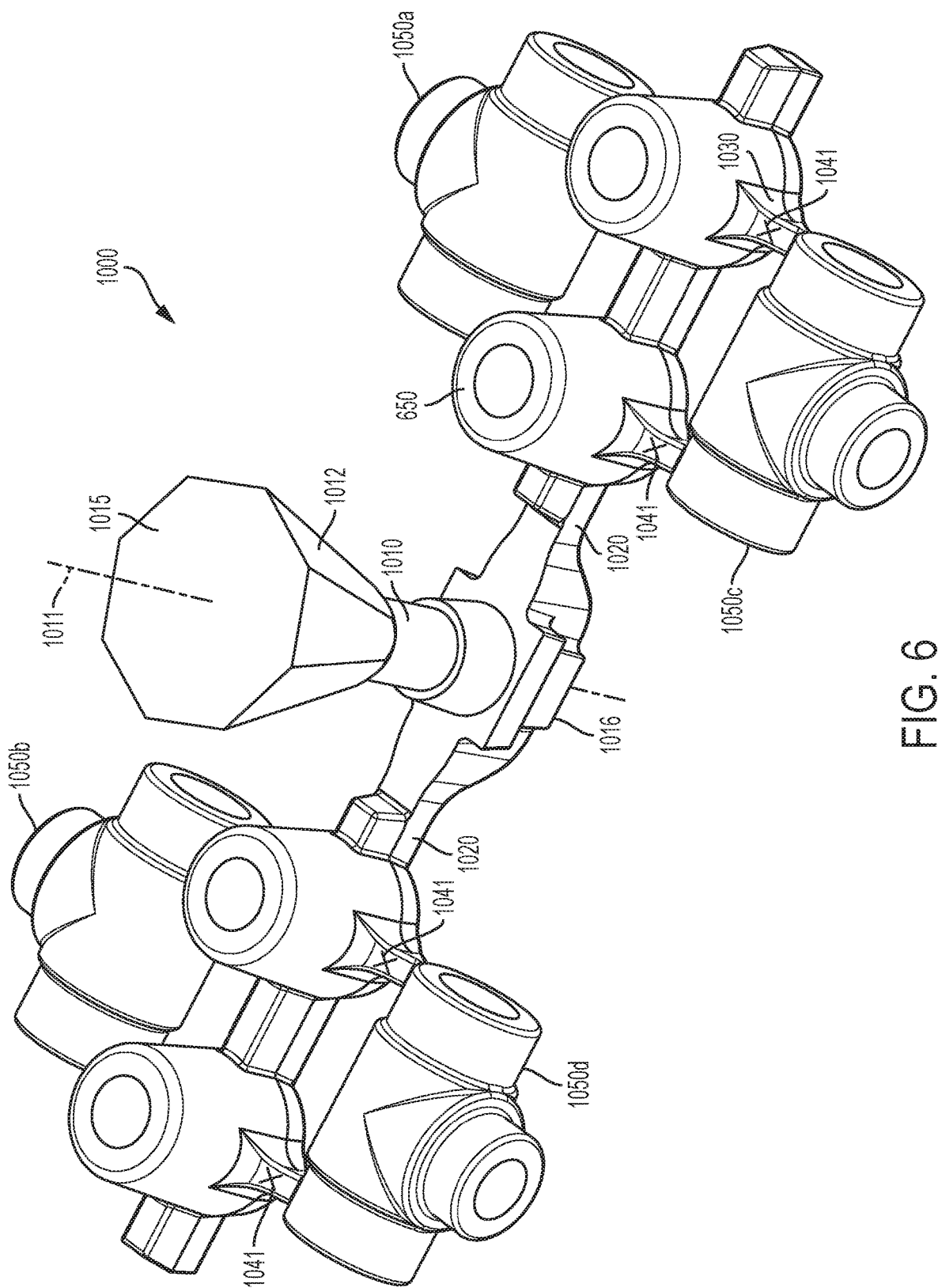
FIG. 6 is a perspective view of the tree of FIG. 1 in accordance with another aspect of the current disclosure.

As shown in FIG. 6, again, the tree 1000 can comprise the sprue 1010, the runner 1020, the plurality of gates 1030, and the plurality of parts 1050; and the plurality of parts 1050 can comprise the parts 1050a,b,c,d, each of which can comprise or define the cut mark 1041. In addition, the tree 1000 can comprise one or more risers 650 to ensure proper filling of the tree 1000 during the molding process, even when the tree 1000 shrinks as expected due to the properties of a material that can naturally produce such shrinkage. The tree 1000 can further comprise various other features to facilitate consistent molding and geometrically accurate parts such as a sprue well at the bottom end 1016 of the sprue 1010 and a slug well or cold slug well at the terminating end of the runners 1020 beyond the outermost gates 1030.

Figure 7:
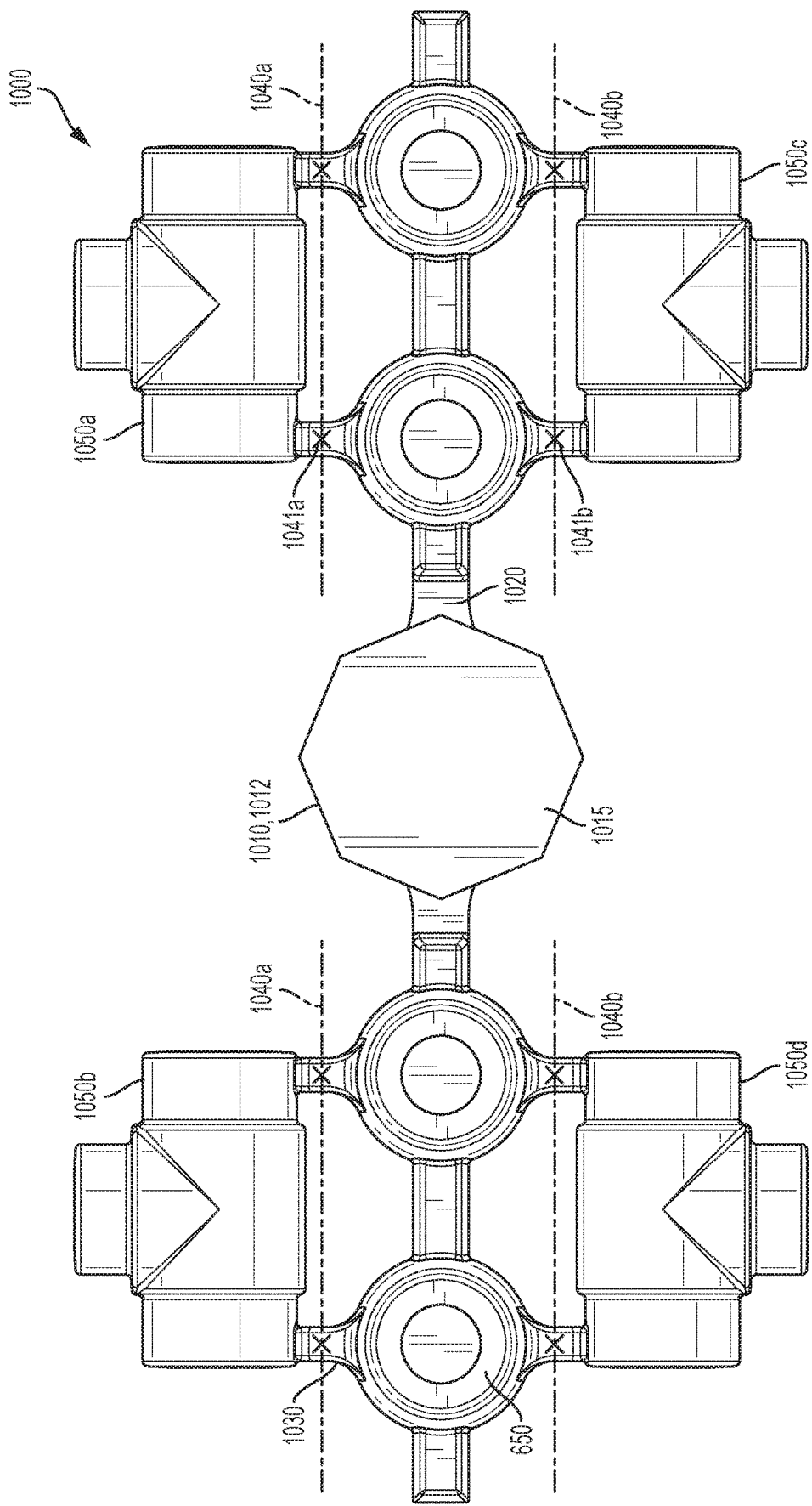
FIG. 7 is a top plan view of the tree of FIG. 6 showing the pair of cutting references.

As shown in FIG. 7, in some aspects, including when a portion of the sprue 1010 such as the pour cup 1012 can intersect and therefore, in some cutting scenarios, also interfere with operation of the cutter 900, separate cutting references 1040a can without interruption align less than all of the cut marks 1041b. Likewise, separate cutting references 1040b can without interruption align less than all of the cut marks 1041b. As desired, moving of the cutter 900 with respect to the tree 1000 or movement of the tree 1000 with respect to the cutter 900 can still result in the parts 1050a,b,c,d being cut from the tree 1000 without the geometry of any of the parts 1050a,b,c,d themselves being cut or otherwise damaged by rotating or otherwise moving the tree 1000. For example and without limitation, the tree 1000 can be rotated or otherwise moved after cutting each part 1050a, b,c,d or after cutting each of a subset of the parts 1050a,b, c,d. As shown, each of the parts 1050a,b,c,d can be joined to the tree with more than one gate 1030. Also as shown, instead of extending directly from the runner 1020, each gate 1030 can extend from another portion of the tree 1000 such as, for example and without limitation, the riser 610.

Figure 8:
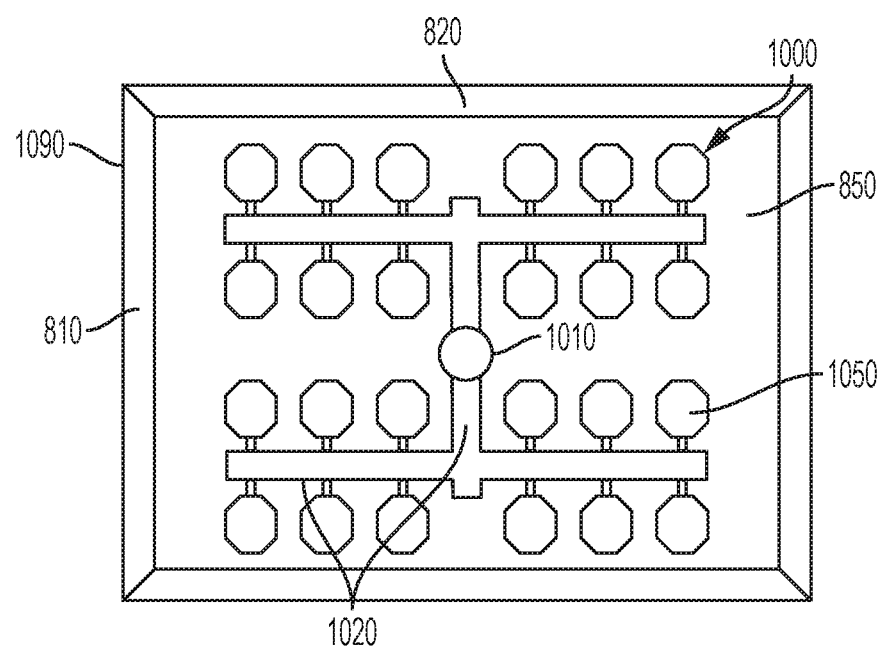
FIG. 8 is a top plan view of the tree of FIG. 1 shown supported by a tray in accordance with one aspect of the current disclosure.

As shown in FIG. 8, the tree 1000—including any portion thereof such as the sprue 1010, the runners 1020, and/or the parts 1050—can be supported in a tray 1090 during the manufacturing process, especially after molding and before or during the process of cutting the parts 1050 from the tree 1000. In some aspects, as shown, the tray 1090 can comprise a pair of first frame members 810 and pair of second frame member 820. In other aspects, the tray 1090 can comprise a single first frame member 810 forming a frame configured to support the tree 1000. A panel 850 can extend between the pair of first frame members 810 and the pair of second frame members 820 to form a surface to support the tree 1000, or any other desired shape of the tray 1090 can be created to support the tree 1000.

Figure 9:
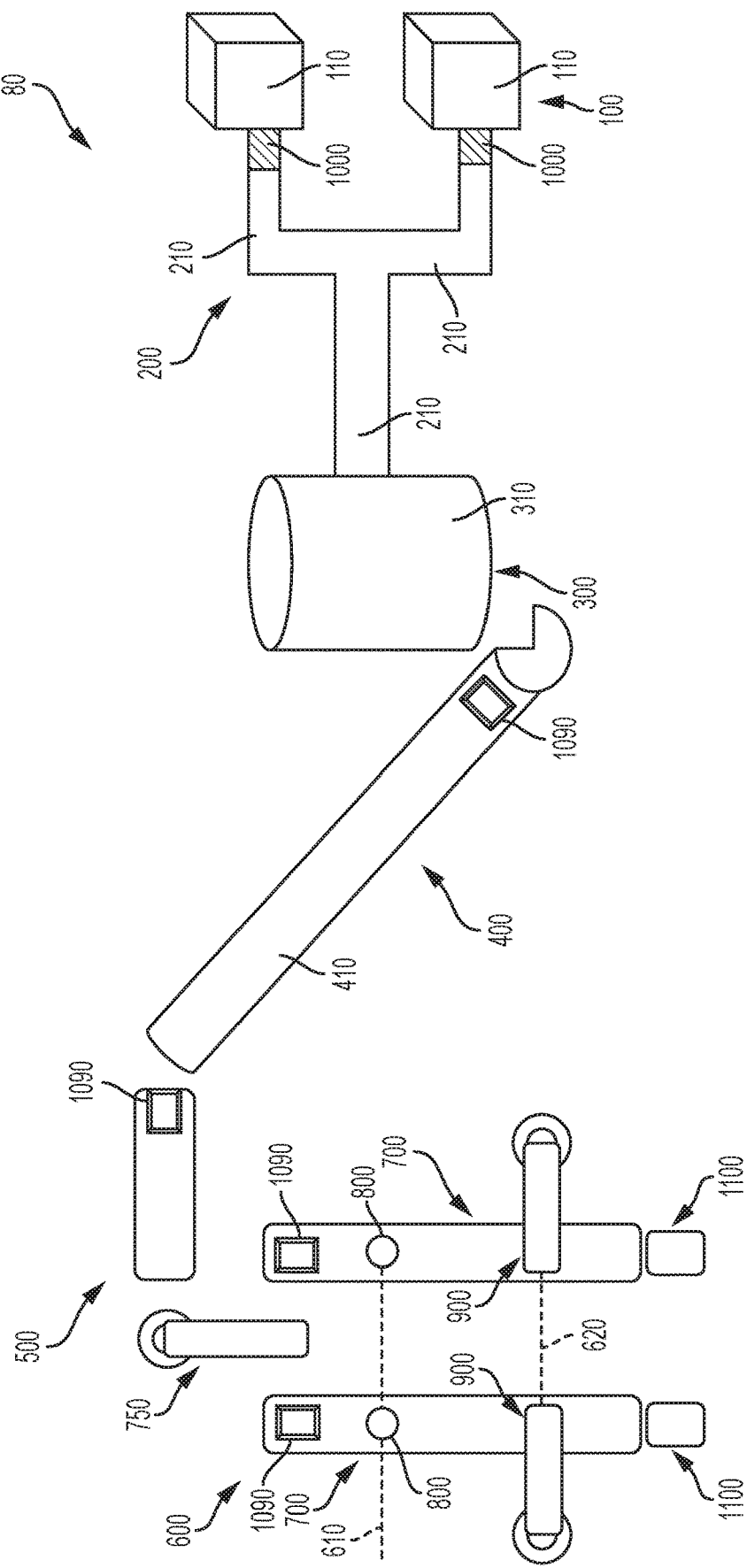
FIG. 9 is a schematic diagram or a top plan view of an automated gate cutting system for cutting the parts from the tree of FIG. 1 in accordance with one aspect of the current disclosure.

As shown in FIG. 9, the system 80 can comprise a molding machine 100, a mold-exit transport apparatus 200, a cooling station 300, a first cleaning station 400, a second cleaning station 500, and a cutting station 600. The system 80 can further comprise and be controlled by a system processor (not shown) that can be configured to transport and process the parts 1050 from start to finish or for any portion thereof. The molding machine 100 can comprise one or more of the molds 110, which can be configured to cast or mold parts in sets. The molds 110, upon being closed, can define a cavity (not shown) that can be injected with a molten metal, plastic, or other material sufficient in volume to fill the cavity. Upon being opened, the parts 1050 can be ejected from the molds 110 and transferred to the next station in the system 80, which can comprise the mold-exit transport apparatus 200.

As shown in FIG. 9, the process that each cast or molded tree 1000 can follow through the system 80 will now be described. This process can be repeated many times over for any number of trees 1000 processed in series or in parallel by simply adjusting or expanding the elements of the system 80 as desired.

The mold-exit transport apparatus 200, which can comprise a walking beam 210, can be configured to lift and/or transport the tree 1000 from the molding machine 100 to the cooling station 300. In one aspect, the tree 1000 can be transported along the mold-exit transport apparatus 200 in gradual or incremental steps. In another aspect, the tree 1000 can be transported in a single step. In yet another aspect, the mold-exit transport apparatus 200 can comprise a conveyor (not shown) on which the tree 1000 can be transported. Upon reaching the end of the mold-exit transport apparatus 200, the tree 1000 can be transferred from the mold-exit transport apparatus 200 to the next station in the system 80, which can comprise the cooling station 300.

The cooling station 300, which can comprise a cooling tower 310 such as, for example and without limitation, a HUNTER cooling tower, can be configured to cool the tree 1000, which, depending on the casting or molding process and the cast or molded material, can reach temperatures as high as 1000 to 2000° C. (1832 to 3632° F.) or even higher. At the cooling station 300, the tree 1000 can be made to spiral inside the cooling tower 310 to help dissipate heat until the tree 1000 solidifies and the temperature of the tree 1000 is at a desired level for transferring the tree 1000 to the first cleaning station 400. Upon reaching the end or exit of the cooling tower 310, the tree 1000 can be transferred from the cooling tower 310 to the next station in the system 80, which can comprise the first cleaning station 400.

The first cleaning station 400, which can comprise a vibratory table 410, can be configured to clean the tree 1000 by, for example and without limitation, removing casting residue from the tree 1000. In one aspect, the casting residue (not shown) can be sand that is left on the tree 1000 when it is cast using a sand casting process. The agitation of the tree 1000 produced by the vibratory table 410 of the first cleaning station 400 can cause the sand to separate from the tree 1000. Removing the sand or other casting residue can reduce the risk that the sand will interfere with further processing of the tree 1000 or the individual parts 1050 or subsequent distribution and installation of the parts 1050. In another aspect, the casting residue can be a different material or the first cleaning station 400 can comprise a different process for removal of the casting residue. Whether or not the tree 1000 is cleaned further at the first cleaning station 400—or cleaned using any particular process, the first cleaning station 400 can be used to transport the tree 1000 to the next station, which can comprise the second cleaning station 500.

The second cleaning station 500, which can comprise a high-pressure water jet head (not shown), can be configured to further clean the tree 1000. In one aspect, the water jet head can use water only. In another aspect, the water jet head can mix abrasive particles with the water as part of a slurry for faster or more aggressive cleaning of the tree 1000, or the abrasive particles can be introduced in the liquid stream immediately before exiting the water jet head. In yet another aspect, a fluid other than water can be used. In yet another aspect, abrasives can be used to clean the tree 1000 without any fluid such as can be done with a bead-blasting process. Whether or not the tree 1000 is cleaned further at the second cleaning station 500—or cleaned using any particular process, the second cleaning station 500 can be used to transport the tree 1000 to the next station, which can comprise the cutting station 600.

Figure 10:
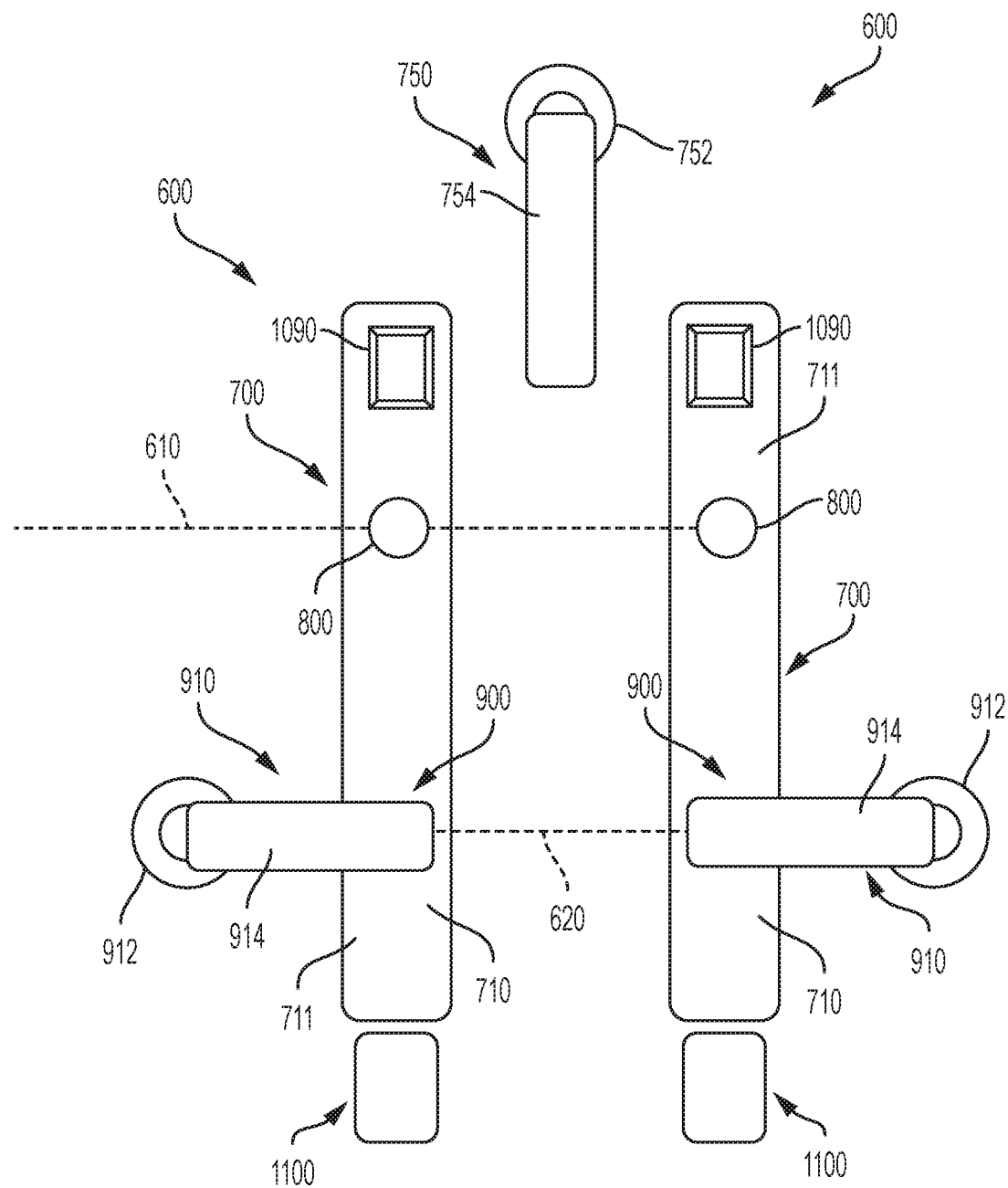
FIG. 10 is a detail view of a cutting station of the system of FIG. 9.

As shown in FIG. 10, the cutting station 600 can comprise a transport apparatus 700, the camera 800, and the cutter 900. The transport apparatus 700 can comprise a conveyor 710 (shown in FIG. 9) configured to support and transport the tree 1000. The conveyor can be configured to move the tree 1000 from the second cleaning station 500 to a first position 610, which can be a measurement position, proximate to the camera 800. The conveyor 710 can further be configured to move the tree 1000 from the first position 610 to a second position 620, which can be a cutting position, proximate to the cutter 900. In one aspect, the conveyor 710 can comprise a substantially upward-facing surface 711 (shown in FIG. 10) configured to support and transport the tree 1000. The surface 711 can be solid or porous and can comprise a continuous piece of material or be formed from an assembly of multiple components. In any case, the tree 1000 can sit on top of the conveyor 710 by its own weight and can be accessed from a top side of the tree 1000 when the tree 1000 is so positioned.

In another aspect, the transport apparatus 700 can comprise an overhead conveyor (not shown), and the tree 1000 can extend in a vertical orientation below the overhead conveyor and can be accessed from the bottom and from any side. In yet another aspect, the transport apparatus 700 can comprise a side-facing conveyor or rail (not shown), and the tree 1000 can extend horizontally from the conveyor or rail and can be accessed from the top and the bottom and from most sides. In any of these aspects, the transport apparatus 700 can comprise a gripper (not shown), which can hold a portion of the tree 1000 such as the sprue 1010 and thereby fix the position and orientation of the tree 1000 in one or more axes to facilitate the measuring and cutting processes that will be described below. In any of these aspects and at any point in the system 80, the tree 1000 can be secured to or placed on top of the tray 1090, which can be configured to likewise fix the position and orientation of the tree 1000. In some aspects, precise initial positioning of the tree 1000 relative to the conveyor 710 at the first position 610 need not be critical, but maintaining the position and orientation of the tree 1000 relative to the conveyor between the first position 610 and the second position 620 can facilitate an accurate cutting operation.

The transport apparatus 700 can comprise a robotic arm 750 configured to transport the tree 1000 to the conveyor 710. The robotic arm can comprise a base 752 (shown in FIG. 10), arm members 754 (shown in FIG. 10), and articulated joints 1250 (shown in FIG. 12) joining adjacent arm members 754.

In one aspect, the cutting station 600 can comprise a pair of conveyors 710 for cutting parts 1050 from the respective trees 1000 in parallel. In another aspect, the cutting station 600 can comprise just a single conveyor 710 or more than two conveyors 710 as desired to optimize the movement of the trees 1000 through the system 80 and minimize bottlenecks.

The camera 800 can be positioned to face a top, a bottom, or a side of the tree 1000. In one aspect, the camera 800 has a fixed position. In another aspect, the camera 800 has an adjustable position. The camera 800 can be configured to identify the cut mark 1041 corresponding to the cutting reference 1040 for each part 1050. The camera 800, or a separate image processor (not shown) between the camera 800 and the cutter 900, can be configured to translate into digital code and save to memory the position of each of the cut marks 1041 and each of the cutting references 1040 for subsequent use by the cutter 900. In various aspects, the brightness of the illumination (e.g., in lumens) at the cutting station 600 and particularly at the first position 610 can be adjusted to facilitate the operation of the camera 800.

As shown in FIG. 10, the cutter 900 can further comprise a robotic arm 910, which can comprise a base 912, arm members 914, and articulated joints (not shown) joining adjacent arm members 914. The robotic arm 910 and the cutting tool secured thereto can be manipulated by a cutting processor (not shown) configured to translate the data from the image processor into instructions for the robotic arm 910. Using those instructions, the cutting processor can position and orient the cutting tool (using the robotic arm 910 when present) and then operate the cutting tool to cut the part 1050 from the tree 1000 at the cutting reference 1040. Where operation of the cutting tool produces material dust or debris, a vacuum system (not shown) can be used to remove the dust or debris from the area around where the cutting operation is performed to eliminate the effect of such dust or debris on the operation of the camera 800 and wear and tear on other components of the cutting station 600 and more broadly the system 80. In some aspects, the robotic arm 910 can be structured similarly to and can function similarly to the robotic arm 750.

Once the desired number of parts are cut from the tree, as observed by the camera 800 and cut by the cutter 900, the conveyor 710 can transport the individual parts 1050 and the remaining part of the tree 1000 to a collection station 1100, before, during, or after which the parts 1050 can be isolated and processed further as desired. For example and without limitation, through a manual or automatic process, the parts 1050 can be made to go into one tub (not shown) and the remaining portion of the tree 1000, i.e., the gating, into another tub (not shown).

In one aspect, the measuring and cutting operations can leave a portion of the gate 1030 on the part 1050, a portion which can be removed by a separate process not described herein. In another aspect, the accuracy of the measuring operation by the camera and the cutting operation by the cutter 900, and a location of the intersection of the part 1050 and the gate 1030 can eliminate the need to further process the part 1050, at least with respect to removal of any remaining portion of the gate 1030.

Simply stated, a method for separating the part 1050 from the remainder of the tree 1000 can comprise marking the part 1050 with the cut mark 1041, identifying with the camera 800 the cut mark 1041 on the part 1050; transmitting information on the cut mark from the camera 800 to the cutter 900; and cutting the part 1050 from the tree 1000 with the cutter 900. This process can be repeated for each part 1050 on the tree 1000 until all of the parts 1050 are separated from the tree 1000.

Simply stated, a method for processing the tree 1000 through the system 80 can comprise molding the tree 1000 with the mold 110 at the molding machine 100, transporting the tree 1000 from the mold-exit transport apparatus 200 to the cooling station 300, transferring the tree 1000 to the first cleaning station 400, transporting the tree 1000 along the first cleaning station 400 to the second cleaning station 500, cleaning the parts at the second cleaning station 500, transferring the tree 1000 from the second cleaning station 500 to the conveyor 710, transporting the tree 1000 past the camera 800 to identify the locating of the cut marks 1041, transporting the tree past the cutter 900, and cutting each part 1050 from the tree at the corresponding cut mark or cut marks 1041.

Figure 11:
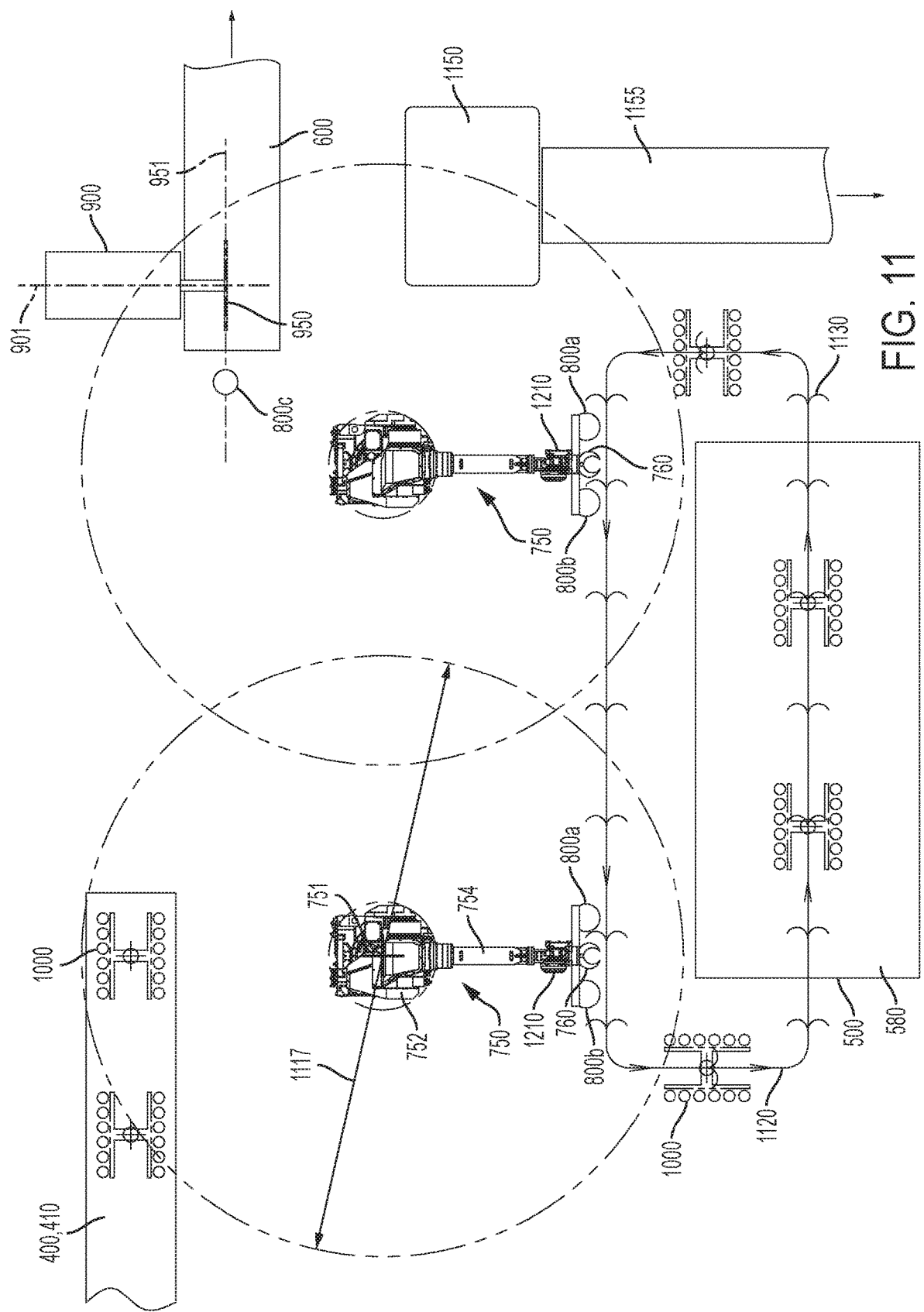
FIG. 11 is a schematic diagram or a top plan view of a portion of the automated gate cutting system of FIG. 9 in accordance with another aspect of the current disclosure.

In some aspects, as shown in FIG. 11, the robotic arm 750 can comprise a gripper 760 configured to grip and pick up the tree 1000 and transport it from the vibratory table 410 of the first cleaning station 400 to a conveyor system 1120, which can comprise an overhead hook conveyor comprising hooks 1130. The conveyor system 1120 can be installed at least partly above, below, or inside the second cleaning station 500, which as shown can comprise a blast cabinet defining a cavity 580 configured to receive each tree 1000 for cleaning using an additional cleaning processing such as, for example and without limitation, the blasting of abrasive media against each tree 1000 that passes through the cleaning system. The abrasive media can comprise, for example and without limitation, steel shot, glass bead, plastic, or a soda material. The abrasive media can be propelled against the tree 1000 using any one of various methods such as, for example and without limitation, stationary air-powered nozzles or wheel-blast system positioned adjacent to the conveyor system 1120. The conveyor system 1120 can be used to transport the tree 1000 from the second cleaning station 500 to the next station, which can comprise the cutting station 600, which can be configured differently than that shown in FIG. 10, as will be described. Upon exit from the second cleaning station 500, a second robotic arm 750 can comprise a gripper 760 configured to grip and pick up the tree 1000 and transport it from the conveyor system 1120 to the cutting station 600. The robotic arm 750 can further comprise a head 1210 configured to rotate, grasp, release, or otherwise move the gripper 760 as desired to manipulate the tree 1000.

The robotic arm 750 can be sized as desired for larger or smaller trees 1000. In some aspects, as shown, the robotic arm 750 can be a 6-axis robot configured for a 50 kg (22.7 pound) payload and a reach radius of 2050 mm (80.7 inches) such as, for example and without limitation, a FANUC model M-710iC/50 robot available from FANUC America Corporation of Rochester Hills, Mich., USA. A reach diameter 1117 can be centered about a robotic arm base axis 751 and can measure twice the reach radius. At least a portion of each of the first cleaning station 400, the second cleaning station 500, and the cutting station 600 can be positioned within the reach diameter 1117 to allow access to each by the robotic arm 750.

As shown, the cutting station 600 can comprise the cutter 900. The cutter 900 can be any device able to separate the part 1050 from the rest of the tree 1000. The cutter 900 can comprise a cutting tool or cutting implement 950 defining a cutting plane 951. In some aspects, the cutting implement 950 can comprise, for example and without limitation, a rotating cutting wheel, a blade (such as, for example and without limitation, that which is part of a band saw), jaws or shears, or another mechanical cutting device powered by, for example and without limitation, electric power, hydraulic power, or pneumatic power. In other aspects, the cutting implement 950 can comprise, for example and without limitation, a laser head, a water jet head, a plasma cutting head, or another fluid or thermal cutting device powered by, for example and without limitation, laser power, high-pressure fluid, or ionized gas. The cutter 900 can be stationary. The cutting implement 950 can be configured to spin about a cutting axis 901. The cutting axis 901 can be configured to remain stationary during removal of the part 1050 from the tree 1000 by movement of the tree 1000 past the cutting implement 950.

At least a portion of a scrap station 1150 can be positioned within the reach diameter 1117 to allow access to the scrap station 1150 by the robotic arm 750. The scrap station 1150 can be coupled to a scrap conveyor 1155, which can be configured to transport the remaining portion of the tree 1000 after removal of the parts 1050 from the scrap station 1150 to a re-melt station (not shown) for re-use of raw material in the part fabrication process.

Figure 12:
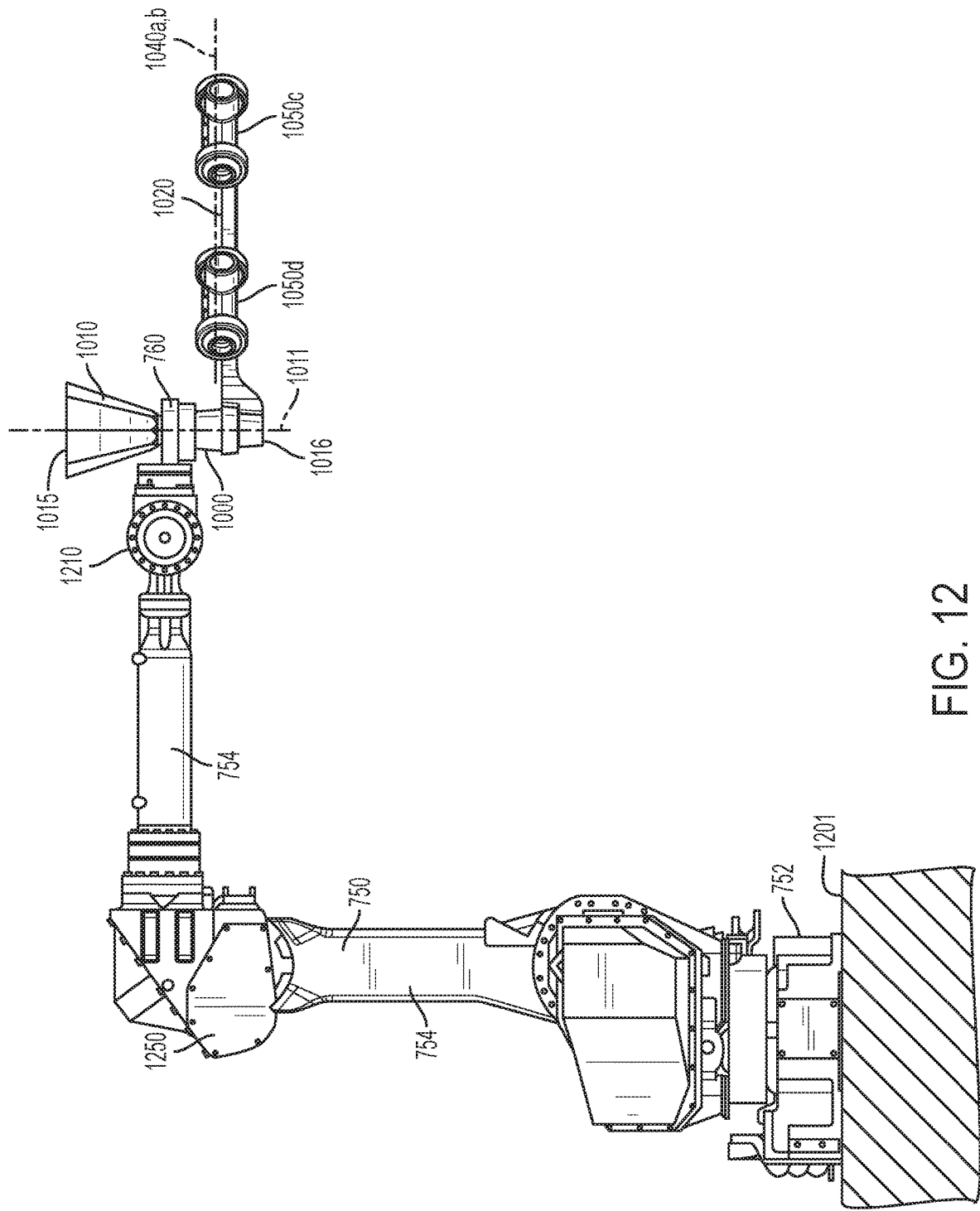
FIG. 12 is a side view of a robotic arm of the system of FIG. 11 shown grasping the tree of FIG. 4.

As shown in FIG. 12, the robotic arm 750 can be mounted to a horizontal surface 1201 such as defined by a floor of a manufacturing facility such as a foundry in which the parts 1050 can be manufactured. As described above, the robotic arm 750 can comprise the base 752, a plurality of arm members 754, and the joint 1250. The robotic arm 750 can further comprise a head 1210 configured to rotate, grasp, release, or otherwise move the gripper 760 as desired to manipulate the tree 1000. As shown, the robotic arm can position the tree 1000 such that the sprue axis 1011 is in a vertical orientation and the cutting references 1040a,b are in a horizontal orientation. The robotic arm 750 can further comprise a cover as necessary to protect it from the damage by the surrounding environment or be built with a higher IP (ingress protection) rating such as, for example and without limitation, IP 54 or even IP 67 at a minimum.

Figure 13:
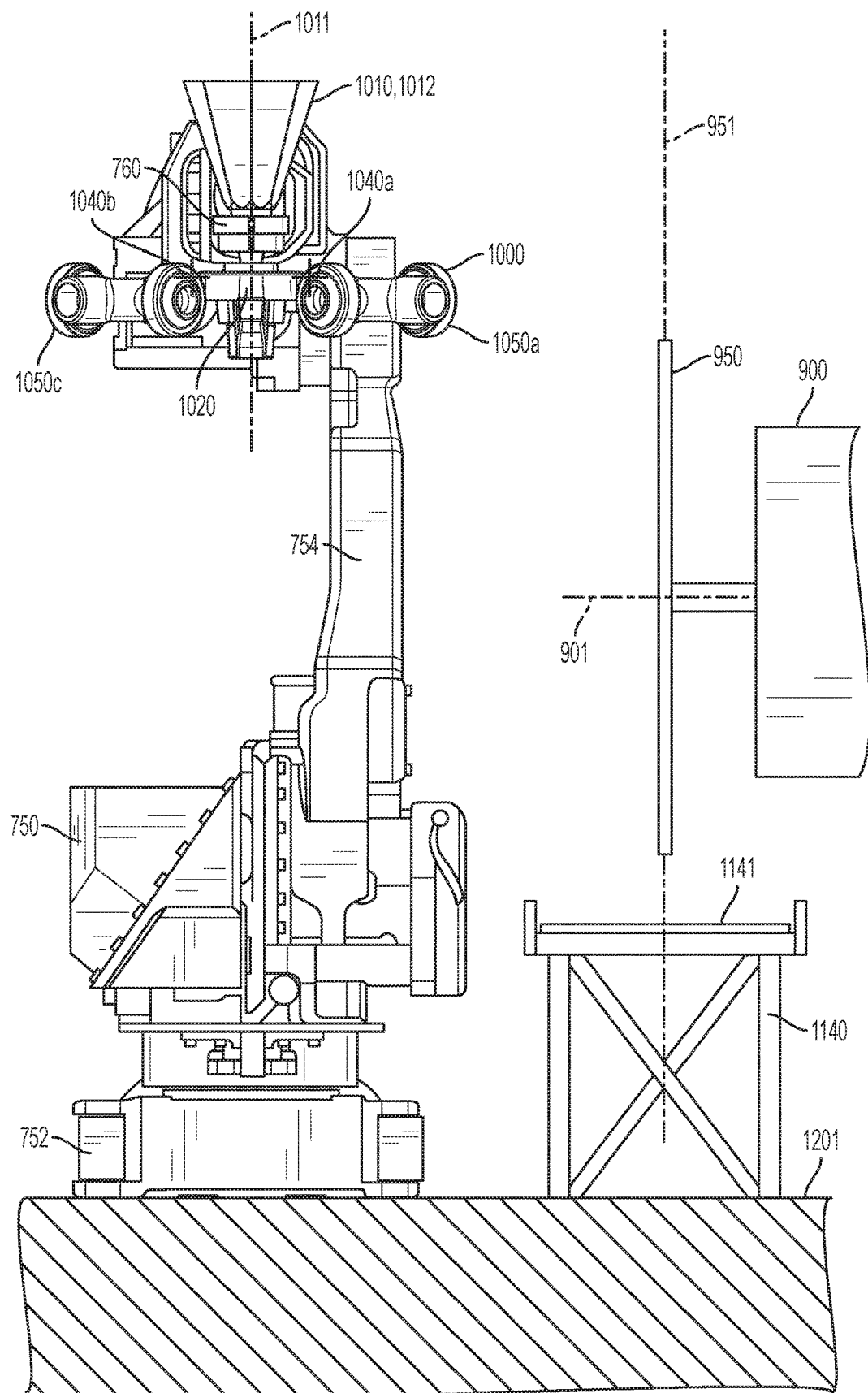
FIG. 13 is a front view of the robotic arm of FIG. 12 shown holding the tree of FIG. 4 in proximity to a cutter of the system of FIG. 11.

As shown in FIG. 13, the robotic arm 750 can be positioned within range of the cutter 900. In order to cut a part 1050a or a line of parts 1050a,b (1050b shown in FIG. 4) from the tree 1000, the cutting reference 1040a can be aligned with the cutting plane 951 of the cutting implement 950 of the cutter 900 and then the tree 1000 moved by the robotic arm 750 through the cutting implement 950 such that the cutting implement 950 cuts through a portion of the tree 1000 at the cutting reference 1040a to separate the desired part or parts 1050a,b. In order to cut a part 1050c or a line of parts 1050c,d (1050d shown in FIG. 12) from the tree 1000, the cutting reference 1040b can be aligned with the cutting plane 951 of the cutting implement 950 of the cutter 900 such that the cutting implement 950 cuts through a portion of the tree 1000 at the cutting reference 1040b to separate the desired part or parts 1050a,b. In some aspects, after cutting of each of the parts 1050 from the tree 1000, each part 1050 can be dropped onto a conveyor surface 1141 of a conveyor 1140, which can be positioned below the cutting implement 950. The conveyor 1140 can thereby support and then transport each part 1050 to final processing (not shown), which can comprise grinding off, cutting off, or otherwise removing a portion of the gate 1030 that can remain on each part 1050 and can comprise inspecting, packing, and shipping the parts 1050.

As shown in FIG. 11, the robotic arm 750 can be configured with a vision system comprising cameras 800a,b. In some aspects, the cameras 800a,b can be positioned on either side of, above, or below the head 1210 and the gripper 760. In other aspects, the cameras 800a,b can be positioned above or below the head 1210 and the gripper 760. By "seeing" the tree 1000 and specifically the cut marks 1041 through the "eye" of the camera, which can be a video camera as might typically be used in a vision system in a factory to identify parts or portions thereof, the camera or cameras 800a,b can facilitate the picking up, manipulation, and cutting of the parts 1050 from the tree 1000. A stationary camera 800c can be positioned proximate to the cutting station 600 and looking downwards from above the cutting station 600 to "see" the cutting implement 950 and confirm alignment between the cutting reference 1040 and the cutting plane 951.

Based on positions of the cut marks 1041 relative to the cameras 800a,b, the second robotic arm 750 can move the tree 1000 through the cutting implement 950 a sufficient distance to separate the parts 1050 from the tree 1000. In some aspects, the parts 1050 can be removed from the tree 1000 in any desired order. In other aspects, the parts 1050 can be removed in an order that minimizes unnecessary manipulation and movement of the tree 1000 by the robotic arm 750. When removing each part 1050 from the tree 1000 requires splitting the tree 1000 into parts A and B (not shown), the robotic arm 750 can manipulate the tree 1000 such as to remove the parts 1050 on part A of the tree 1000 and can then cut parts A and B apart by placing of a cut mark 1041 proximate to the point of division between the parts A and B, depositing one or both of the parts A and B on the tray 1090 as desired. The robotic arm 750 can then pick up and manipulate part B of the tree 1000 to remove the parts 1050 therefrom. When ready to pick up the tree 1000, the cameras 800a,b can be used to "see" the pour cup 1012 of the sprue 1010 and position the gripper 760 around the sprue 1010 accordingly.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A system for separating a part from a monolithic tree, the system comprising:

a camera positioned facing the tree and configured to identify a cut mark on a gate of the tree, the tree comprising a runner, the part connected to the runner with the gate, each of the runner, the gate, and the part comprising a cast material; and a cutter configured to cut the part from the tree at the cut mark.

2. The system of claim 1, further comprising a robotic arm, wherein the robotic arm comprises the cutter.

3. The system of claim 1, further comprising a robotic arm comprising a gripper configured to grip and hold the tree.

4. The system of claim 1, further comprising a conveyor configured to support and transport the tree through a cutting station.

5. The system of claim 1, wherein the cutter comprises a cutting implement.

6. The system of claim 5, wherein the cutting implement defines an axis about which the cutting implement is configured to rotate, the axis configured to remain stationary during removal of the part from the tree.

7. A monolithic tree comprising:

a sprue;

a runner formed integrally with the sprue;

a plurality of parts, each of the plurality of parts formed integrally with the runner; and a plurality of gates, each gate comprising a cut mark and connecting a one of the plurality of parts to the runner, wherein an orientation and a position of each cut mark in three-dimensional space with respect to the runner is perceivable by an automated gate cutting system.

8. The tree of claim 7, further comprising a silicon-brass alloy.

9. The tree of claim 7, wherein a portion of the cut mark protrudes from a surface of each of the plurality of gates.

10. The tree of claim 7, wherein a portion of the cut mark is recessed below a surface of each of the plurality of gates.

11. The tree of claim 7, wherein a first portion of the cut mark of each of the plurality of gates intersects a second portion of the cut mark.

12. The tree of claim 7, wherein a corresponding portion of the cut mark of each of the plurality of gates is aligned along a single axis.

13. A method for separating a part from a monolithic tree, the method comprising:

marking the tree with a cut mark;

identifying the cut mark with a camera;

determining an orientation and a position of the cut mark;

determining an orientation and a position of the tree from the orientation and the position of the cut mark;

transmitting information on the orientation and position of the tree from the camera to a cutter; and cutting the part from the tree.

14. The method of claim 13, further comprising gripping a portion of the tree with a robotic arm.

15. The method of claim 13, further comprising transporting the tree from a first position to a second position.

16. The method of claim 15, wherein the second position is a cutting station.

17. The method of claim 15, wherein transporting the tree from a first position to a second position comprises transporting the tree with a robotic arm.

18. The method of claim 13, further comprising aligning a cutting reference of the tree with a one of a cutting line and a cutting plane of the cutter.

19. The method of claim 13, wherein cutting the part from the tree comprises automatically cutting the part from the tree based on the information transmitted to the cutter.

20. The system of claim 1, wherein the cut mark is formed monolithically with the tree from the cast material.

\* \* \* \* \*